MEANS FOR FEEDING SLIVERS TO COILERS

Original Filed Sept. 12, 1955 4 Sheets-Sheet 1

INVENTOR:
JOE R. WHITEHURST,

BY Eaton & Bell

ATTORNEYS

MEANS FOR FEEDING SLIVERS TO COILERS

Original Filed Sept. 12, 1955 4 Sheets-Sheet 2

INVENTOR:
JOE R. WHITEHURST

BY Eaton + Bell

ATTORNEYS

MEANS FOR FEEDING SLIVERS TO COILERS
Original Filed Sept. 12, 1955 4 Sheets-Sheet 3
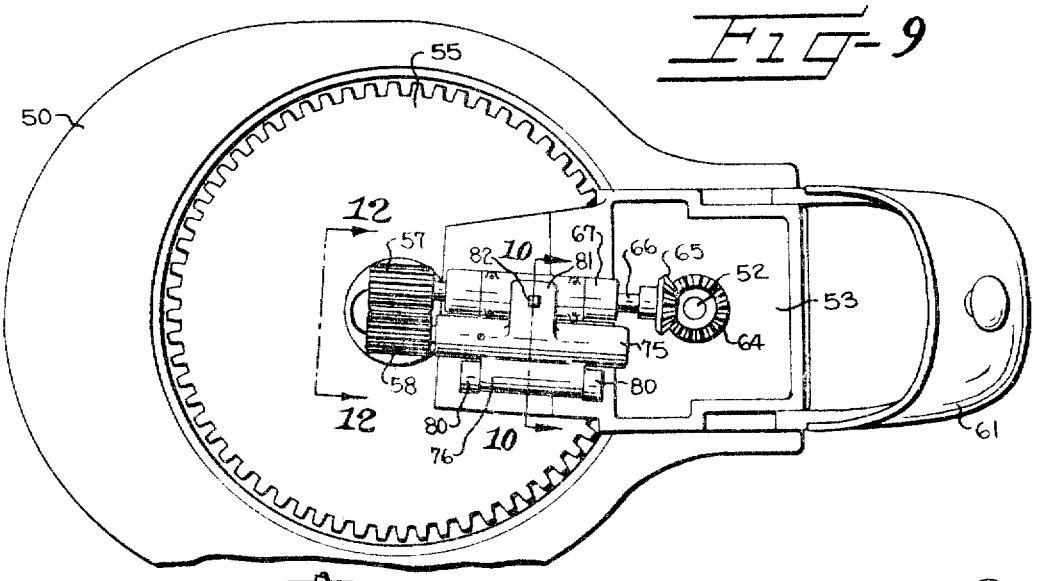
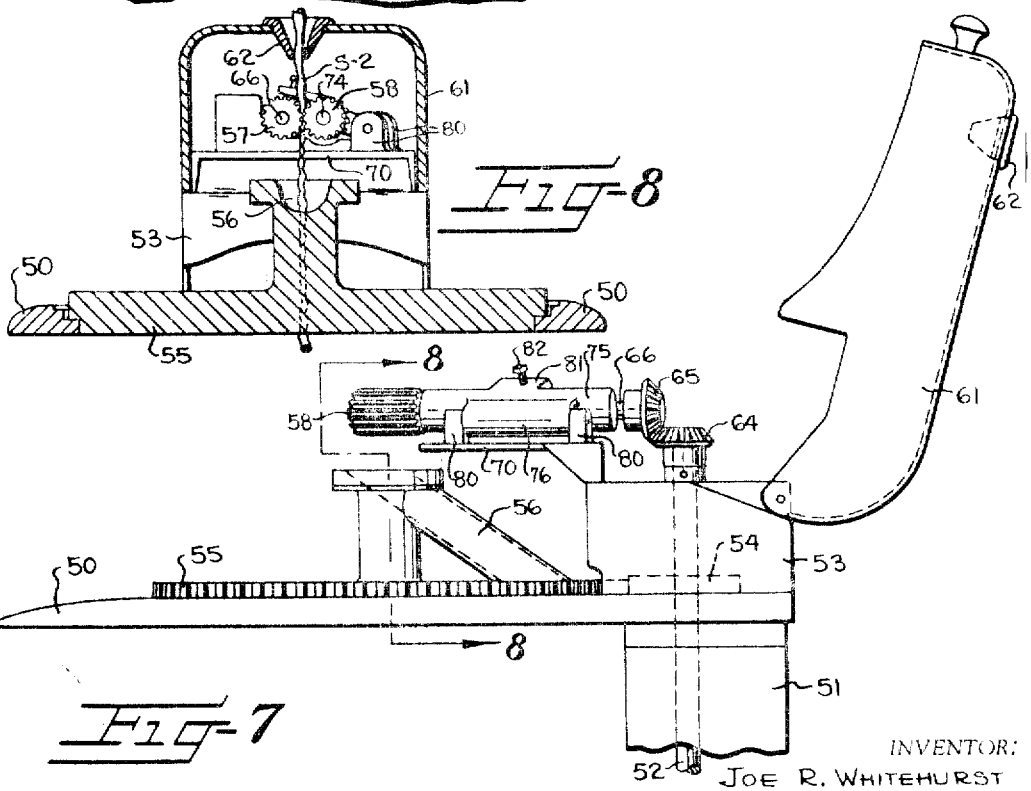
INVENTOR:
JOE R. WHITEHURST
BY Eaton + Bell
ATTORNEYS

MEANS FOR FEEDING SLIVERS TO COILERS

Original Filed Sept. 12, 1955 4 Sheets-Sheet 4

INVENTOR:
JOE R. WHITEHURST

BY Eaton & Bell

ATTORNEYS

United States Patent Office

Re. 26,135
Reissued Jan. 3, 1967

26,135

MEANS FOR FEEDING SLIVERS TO COILERS

Joe R. Whitehurst, Bessemer City, N.C., assignor to Ideal Industries, Inc., Bessemer City, N.C., a corporation of North Carolina Original No. 2,878,527, dated Mar. 24, 1959, Ser. No. 533,735, Sept. 12, 1955. Reissue No. 25,520, dated Feb. 11, 1964, Ser. No. 97,710, Mar. 22, 1961. This application for reissue Apr. 8, 1965, Ser. No. 457,888
12 Claims. (Cl. 19—159)

Matter enclosed in heavy brackets [ ] appears in the original patent but forms no part of the first and this reissue specification; matter printed in italics indicates the additions made by the first reissue; matter printed in bold face (except reference figures and claim numbers) indicates the additions made by this reissue

This invention relates to coiler mechanisms and, more especially, to improvements in calender rolls utilized for feeding strands of sliver from drawing frames, carding machines and other sliver processing machines into coiler mechanisms which coil the slivers into cans.

As is well known, coiler mechanisms include a coiler head having a driven disk or tube gear provided with an inclined tubular passageway for directing sliver from a pair of calender rolls downwardly and outwardly from the center of the disk or tube gear to be discharged from the lower end thereof in off-center relation to the axis thereof to form the sliver into coils in a can positioned beneath the disk or tube gear. Heretofore, the calender rolls have had smooth peripheral surfaces with both of the calender rolls of a pair being driven at constant speeds and at the same peripheral speeds and this would cause the calender rolls to rotate varying amounts, or slip, relative to the sliver being pulled thereby through the usual trumpet, due to the lack of sufficient traction between the calender rolls and the sliver. This, in turn, would result in uneven density and thickness of the sliver throughout its length.

In addition, the smooth peripheral surfaces on the calender rolls heretofore employed have pressed the fibers together to such an extent as to remove most or all of the crimp previously formed in the sliver during the drafting of the fibers on, for example, a drawing machine. Also, since the types of fibers in and the size of different slivers may vary, in order to provide for the proper speed of movement of the sliver at the nip of the calender rolls, it has been necessary heretofore to frequently change gears which transmit rotation from the drawing rolls to the calender rolls.

It is an object of this invention to provide an improved calender roll unit for a coiler mechanism comprising first and second fluted calender rolls in which only the first calender roll is driven and the first calender roll imparts rotation to the second calender roll by intermeshing engagement with the flutes thereof and by engagement of the rolls with the sliver therebetween, thus insuring ample traction between the sliver passing through the nip of the calender rolls so the calender rolls cannot slip relative to the sliver and also forming a crimp in the sliver as it passes through the nip of the calender rolls. The crimp formed in the sliver binds the fibers together so as to substantially increase the tensile strength of the sliver as compared to what it would be in the absence of the crimp so the sliver will not become torn apart as it is subsequently withdrawn from the coiler cans.

It is another object of this invention to provide apparatus of the character described wherein the flutes of the calender rolls are provided with a pressure angle of eight degrees in order to more effectively produce the desired crimp in the sliver, it being well known that, heretofore, the flutes of drafting rolls or the teeth of spur gears, for example, have been provided with a pressure angle of approximately fourteen and one-half degrees.

It is still another object of this invention to provide a calender roll unit for coilers wherein a first fluted calender roll is fixed on a driven shaft and a second fluted calender roll meshing therewith is rotatably mounted on a stationary shaft with means for adjusting the stationary shaft toward and away from the driven shaft to thereby adjust the speed at which sliver is drawn through the nip of the calender rolls to accommodate slivers of varying size and density. This variation in sliver speed is due to the greater surface area of the flutes of the two calender rolls which is contacted by the sliver when the calender rolls are close together as compared to such surface area when the calender rolls are spaced substantially apart.

Some of the objects of the invention having been stated, other objects will appear as the description proceeds when taken in connection with the accompanying drawings, in which—

FIGURE 7 is a fragmentary elevation of the upper portion of a coiler head of the type generally used in association with carding machines showing another form of calender roll unit embodying the principles of the present invention and showing the cover or trumpet tongue for the calender roll unit in open position;

FIGURE 8 is a transverse vertical sectional view taken substantially along line 8—8 in FIGURE 7 and showing the cover for the calender roll unit in closed or lowered position;

FIGURE 9 is a fragmentary top plan view of the structure shown in FIGURE 7, also showing the cover for the calender roll unit in raised or open position;

Figure 1:
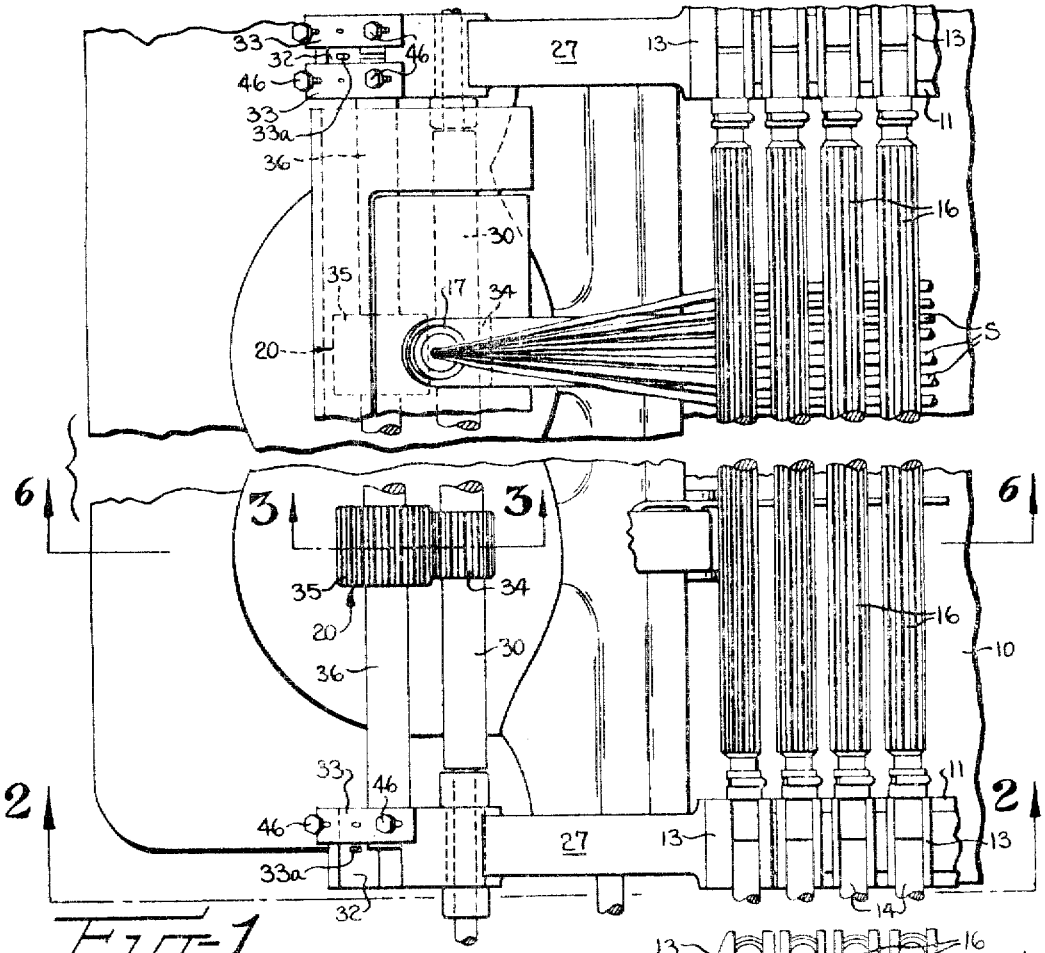
FIGURE 1 is a fragmentary top plan view of a portion of a drawing frame showing a pair of the improved calender roll units mounted thereon.

The invention is embodied in two forms in the drawings wherein the first form of the invention is shown in FIGURES 1 through 6 in association with a drawing frame and, in FIGURES 7 through 12 the invention is shown in association with a coiler head of the type used in association with a carding machine. The drawing frame shown in FIGURES 1, 2 and 6 comprises an elongated frame or beam 10 having a plurality of longitudinally spaced brackets or roll stand supports 11 fixed thereon, on each of which a plurality of conventional bearings 13 are mounted. The bearings 13 have conventional driven bottom drafting rolls 14 and top drafting rolls 16 journaled therein which exemplify one embodiment of sliver processing instrumentalities and between which strands of textile fibers S pass as they are attentuated in the usual manner. The strands S pass forwardly from the rolls 14, 16 and are condensed through corresponding trumpets 17 each of which is associated with a corresponding one of the improved calender roll units, broadly designated at 20, there being a plurality of such calender roll units 20, each of which directs the slivers condensed by the corresponding trumpet 17 into and through an inclined tube 22 carried by a disk or tube gear 23.

The disk or tube gear 23 is driven in the usual manner to deposite the sliver S–1 formed from the sliver strands S in coils in a can 25 mounted on a rotatable base 26, which base 26 is rotated by conventional means, not shown in timed relation to the disk or tube gear 23.

Figure 2:
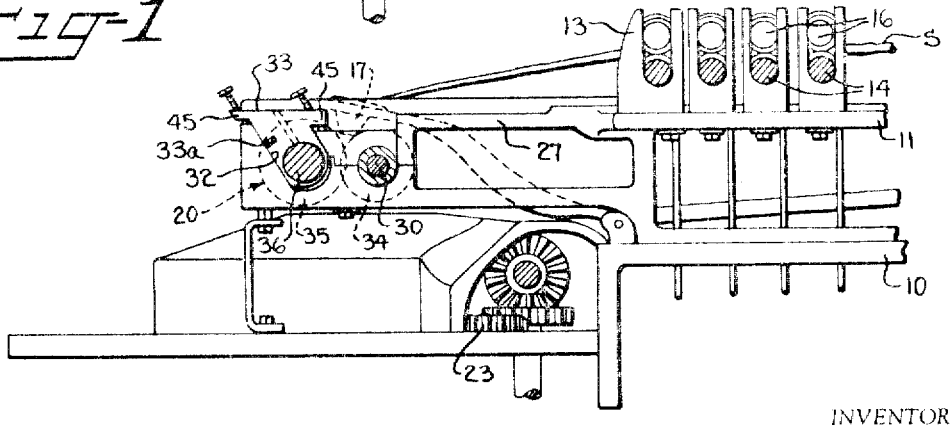
FIGURE 2 is an elevation, partially in section, taken substantially along line 2—2 in FIGURE 1 showing the relationship of the coiler mechanism to the improved calender roll unit.
Figure 6:
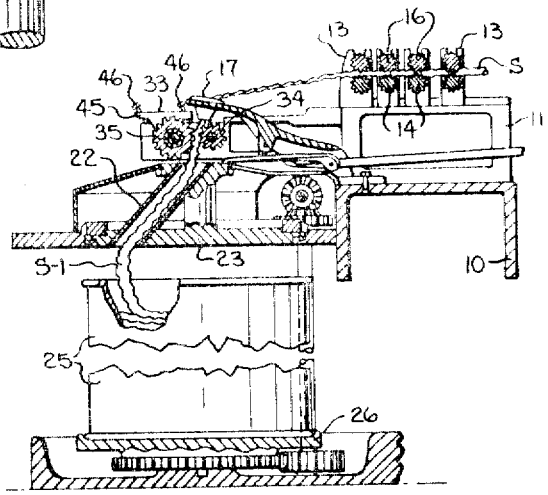
FIGURE 6 is a somewhat schematic vertical sectional view, on a reduced scale, taken substantially along line 6—6 in FIGURE 1.

The drawing frame is shown in FIGURES 1, 2 and 6 as being equipped with conventional calender roll stands 27 which are shown as being formed integral with the brackets or roll stand supports 11 and a driven calender roll shaft 30 is journaled in the stands 27 and is driven by conventional gearing, not shown, to rotate in proper timed relation to the drafting rolls 14, 16. Such conventional gearing includes change-gears for adjusting the speed of the calender rolls relative to the drafting rolls 14, 16. The improved calender roll units obviate the necessity of changing the gears to adjust the rate at which the sliver S–1 is fed into the coiler tube 22, as will be further described later in this context.

It will be noted in FIGURE 2 that the upper surface of each calender roll stand 27 is provided with a forwardly and downwardly inclined slot 32 therein for reception of improved adjustable stationary calender-roll-shaft-supporting blocks 33 which blocks 33 are parts of the present invention. The blocks 33 are restrained from endwise movement in the slots 32 by pins or screws 33a.

The improved calender roll units 20 each includes a pair of fluted calender rolls 34, 35, the first calender roll 34 being fixed on the driven calender roll shaft 30 and the second calender roll 35 being loosely or rotatably mounted on a shaft 36. Opposite ends of the shaft 36 are fixed in the corresponding blocks 33. It is customary to provide a separate shaft for every two idler calender rolls. Therefore two of the improved calender roll units 20 are associated with each shaft 36, but shaft 30 is common to all such units on a given drawing frame.

Figure 3:
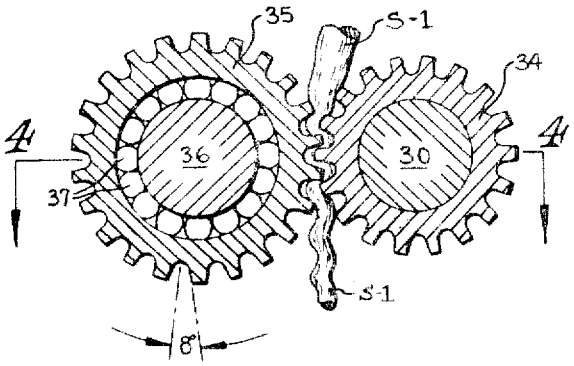
FIGURE 3 is an enlarged fragmentary vertical sectional view taken substantially along line 3—3 in FIGURE 1.
Figure 4:
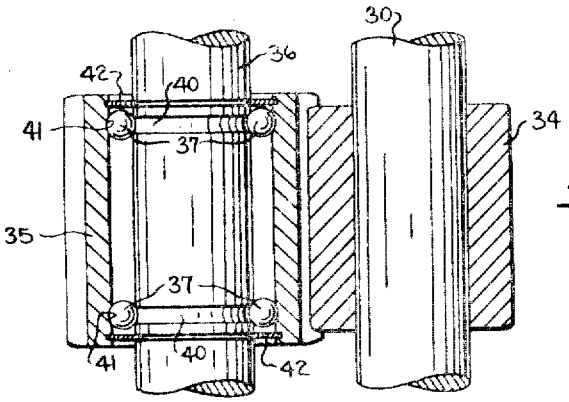
FIGURE 4 is a fragmentary sectional plan view taken substantially along line 4—4 in FIGURE 3.

It will be noted in FIGURES 3 and 4 that the flutes on the improved calender rolls 34, 35 have pressure angles of eight degrees as compared to the usual fourteen and one-half degrees of spur gears and fluted rolls such as are normally used as drafting rolls and, in order to minimize the frictional contact between the shaft 36 and the second fluted calender roll 35, it will be observed in FIGURES 3 and 4 that the second calender roll 35 is tubular and is mounted on the shaft 36 by means of anti-friction bearings. In this instance, the anti-friction bearings are shown in the form of a pair of circular rows of balls 37 which fit in complementary grooves 40 and 41 formed in the proximal surfaces of the shaft 40 and the calender roll 35. It is preferable that a suitable lubricant is provided within the calender roll 35 and, therefore, suitable lubricant seals 42 may be provided on opposite ends of the tubular calender roll 35.

Since the shaft 36 is stationary and the second calender rolls 35 are loosely journaled on the shaft 36, it is apparent that the second calender rolls 35 are driven solely by the corresponding first calender rolls 34 and by the sliver pasisng through the nip of the calender rolls 34, 35. Accordingly, the flutes of the calender rolls 34, 35 insure that the rolls cannot slip relative to the sliver S–1 passing therebetween, thereby minimizing the variations in thickness of the sliver passing therebetween. Also, the flutes, and particularly the pressure angle of the flutes, causes the sliver S–1 to be severally crimped as it passes through the nip of the fluted calender rolls thereby compressing the fibers at closely spaced points to an extent heretofore unattainable and thus substantially increasing the tensile strength of the sliver S–1 as compared to what its strength would be if it were not crimped.

The crimping of the sliver prior to its passing through the inclined tubular passageway of the disk or tube gear 23 minimizes the stretching of the sliver as it is withdrawn from the can 25 in subsequent processes and, accordingly, minimizes variations in the diameter or size of the sliver as it is subsequently processed. Heretofore, in using conventional types of smooth-faced calender rolls, there has been recurring variations of eighteen percent in the diameter or size of the sliver throughout its length and, without crimping the sliver, as has heretofore been the case, when the sliver has subsequently been withdrawn from the can, it has stretched an average of approximately three and one-half percent and this has caused as much or more than fifty percent variation in adjacent portions of the sliver throughout its length as it was withdrawn from the can in subsequent processing operations. The improved fluted calender rolls have substantially reduced the amount of variation in size or diameter of the sliver as it is directed into the can and crimping of the sliver has maintained any variations therein substantially constant from the time they enter the can until the sliver has passed through subsequent machine processes, thus greatly improving the texture and quality of the roving and yarn subsequently made from such slivers.

Figure 5:
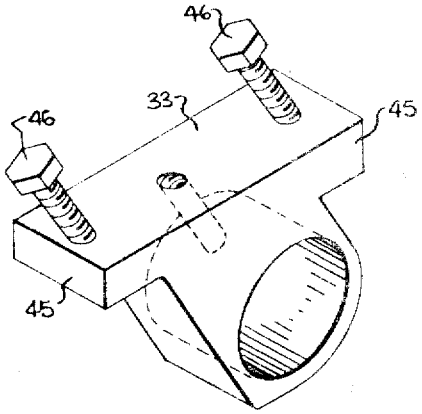
FIGURE 5 is a detail of one of the blocks for supporting the adjustable stationary shaft on which the floating or idler fluted calender roll of each pair is rotatably mounted.

Referring to FIGURES 1, 2 and 5, it will be observed that each of the stationary shaft-supporting blocks 33 has a pair of ears 45 thereon which overlie adjacent front and rear portions of the corresponding calender roll stand 27 and each of the ears 45 has an adjustment screw 46 threaded therethrough whose lower end bears against the upper surface of the corresponding calender roll stand 27. Thus, by adjusting the screws 46, since opposite sides of the blocks [32] *33* engage angularly disposed surfaces of the openings 32 formed in the corresponding calender roll stand *27* [37], it is apparent that the shaft 36 and the floating calender rolls 35 journalled thereon are adjusted toward and away from the driven shaft 30 and the driven calender rolls 34, respectively, to accommodate various kinds and/or sizes of slivers. As illustrated in the drawings, the calender rolls 34, 35 are maintained in their adjusted intermeshing relation during normal operating conditions; i.e., in the absence of a malfunction such as a lap-up of sliver around one of the rolls, by a number of factors. Of primary importance in this form of the invention, as well as the other form to be described in detail later, is the sheer weight of the adjustable calender roll 35 and its associated components such as its shaft, bearing and support, as well as the direction that the adjustable calender roll is rotated by the other calender roll intermeshing therewith. Additionally, in this form of the invention, the position of the inclined slots 32, and the manner in which the same receive the calender roll shaft support blocks 33, further contribute to maintaining the calender rolls in the adjusted intermeshing relation during normal operating condition.

Since the floating calender roll 35, in each instance, is driven solely by the stock passing through the nip of the calender rolls 34, 35, this obviates the necessity of providing different sizes of gears between the main drive of the machine or the drafting rolls 14, 16 and the shaft 30, as has heretofore been required, whenever the sliver is drawn through the nip of the calender rolls at an undesirable rate of speed. The speed of the sliver S–1 is relatively high when the fluted calender rolls 34, 35 are closely intermeshed (FIGURE 3) as compared to its speed when the rolls 34, 35 are loosely intermeshed because, the closer the fluted calender rolls 34, 35 of a unit are to each other, the greater the surface area of the flutes engaged by the sliver. In other words, the flutes of each roll press the sliver into the grooves between the flutes of the mating roll further and more compactly as the rolls are adjusted closer together so that a greater amount of stock is drawn therebetween than is the case when they are adjusted further apart from each other.

This is one of the most important features of the present invention because it often happens that it is desirable to process different types of slivers in adjacent roll sections and calender roll units of a given drawing frame or the like. For example, one sliver may be formed solely from cotton fibers, another may be formed from a blend of cotton fibers and synthetic fibers, etc. This has not been possible heretofore due to the fact that all slivers on a given machine had to be drawn through the calender rolls at the same speed, with the result that one or more slivers would become too taut or break between the drafting zone and the calender rolls while other slivers would become unduly slackened. This condition is overcome with the improved fluted calender roll units 20 because the displacement at the nip of mating fluted calender rolls is adjustable independently of the rolls of adjacent units. This is true even where the fluted idler calender rolls 35 of two adjacent units 20 are mounted on a same shaft, since the block 33 at either end of each shaft 36 may be adjusted toward or away from the driving shaft 30 independently of the block 33 at the other end of the corresponding shaft.

SECOND FORM OF INVENTION

Referring to FIGURES 7 through 12, there is shown the second form of the invention in which the improved fluted calender rolls are shown in association with a coiler head of the type used with carding machines, for example. A carding machine is another embodiment of sliver processing instrumentalities. In this instance, the coiler head comprises a platform 50 which overlies the usual can, not shown, and which is supported on a hollow pedestal or post 51, upwardly through which a conventionally driven shaft 52 extends. The shaft 52 also extends through a gear box 53 fixed on the platform 50 and in which gear box a pinion or gear 54 is positioned and fixed on the shaft 52. The gear 54 meshes with a conventional tube gear or disk 55 having an upwardly and inwardly extending passageway or tube 56 thereon into which a sliver S–2 is directed by a pair of fluted calender rolls which are peculiar to the present invention and are similar to the calender rolls 34, 35 in FIGURES 1, 2, 3, 4 and 6.

The gear box 53 has the usual cover or trumpet tongue 61 pivotally mounted thereon. The trumpet tongue 61 has a conventional trumpet 62 positioned therein for condensing the sliver as it is drawn from the carding machine, for example, and directing the same through the nip of the improved calender rolls 57, 58. The upper end of the driven shaft 52 has a bevel gear 64 fixed thereon which meshes with a bevel gear 65 fixed on one end of a shaft 66 which is the equivalent of the driven shaft 30 in the original form of the invention. The calender roll 57 is fixed on the end of the shaft 66 remote from the gear 65 and the shaft 66 is journaled in a bearing structure 67 carried by a support or bracket 70 which is suitably secured to or formed integral with the gear box 53 and extends inwardly and terminates short of the vertical plane of the open upper end of the tube or passageway 56.

Heretofore, it has been the usual practice to drive the second calender roll 58 by means of suitable gears fixed on the shaft 66 and on a shaft on which the second calender roll 58 was fixedly mounted. However, in this instance, the second or floating fluted calender roll 58 is in the form of a shell or tube and is pressed onto a bushing 71 which serves as the outer race of an anti-friction bearing and which has suitable grooves in the inner peripheral surface thereof in which circular rows of balls 72 are positioned, the inner surfaces of the balls 72 also being positioned in suitable grooves 73 formed in the periphery of a stationary shaft 74. Opposite ends of bushing 71 are preferably provided with suitable lubricant seals 71a, 71b.

The stationary shaft 74 is fixed in a pivoted adjustable bracket 75 which has a relatively broad outwardly projecting portion 76 thereon which is loosely penetrated by a shaft 77. The shaft 77 is fixed in a pair of upwardly projecting portions 80 integral with or suitably secured to the support 70. It will be observed in FIGURES 9 and 10 that the bracket 75 also has an ear portion 81 projecting inwardly therefrom and overlying the bearing assembly 67 in which shaft 66 is journaled. The ear 81 has an adjustment screw or set screw 82 threaded therethrough which bears against the upper surface of the bearing assembly 67 and, by adjusting the screw 82, since the pivot shaft 77 is disposed substantially below the level of the shaft 66, it is apparent that the floating fluted calender roll 58 may be adjusted toward and away from the driven fluted calender roll 57. As stated earlier with respect to the first form of the invention, the sheer weight of the adjustable calender roll 58 and its associated components such as its shaft, bearing and support, serve to maintain the calender rolls 57, 58 in their desired adjusted intermeshing relation during normal operating conditions. As illustrated, in this form of the invention, the pivot shaft 77 for the adjustable bracket 75 which carries the adjustable calender roll 58, is so located with respect to the axes of the calender rolls 57, 58 that it contributes in a similar manner as the inclined slot 32 of the first form of the invention to aid in maintaining the calender rolls in their desired adjusted relation during normal machine operation.

The flutes on the calender rolls 57, 58 are also provided with a pressure angle of eight degrees and it is therefore apparent that the calender rolls 57, 58 function in the same manner as the calender rolls 34, 35 of the first form of the invention to maintain traction between the sliver S–2 and the calender rolls as the calender rolls 57, 58 draw the sliver S–2 therebetween and feed the same into the tube 56 of the tube gear 55. It is also apparent that the rolls 57, 58 severally crimp the sliver to maintain the substantially uniform density in the sliver as it is directed into the corresponding can and to also impart increased tensile strength to the sliver. Of course, it is apparent that the roll 58 may be adjusted toward and away from the roll 57 by means of the screw 82, in the manner heretofore described, to accommodate slivers of varying types and/or sizes.

Figure 10:
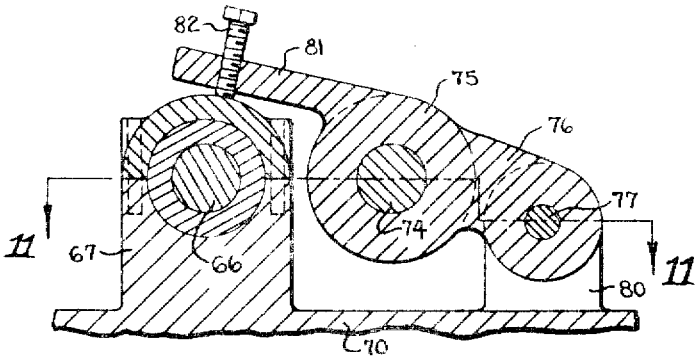
FIGURE 10 is an enlarged transverse vertical sectional view taken substantially along line 10—10 in FIGURE 9 and showing the means for adjusting the idler fluted calender roll relative to the driven calender roll.
Figure 11:
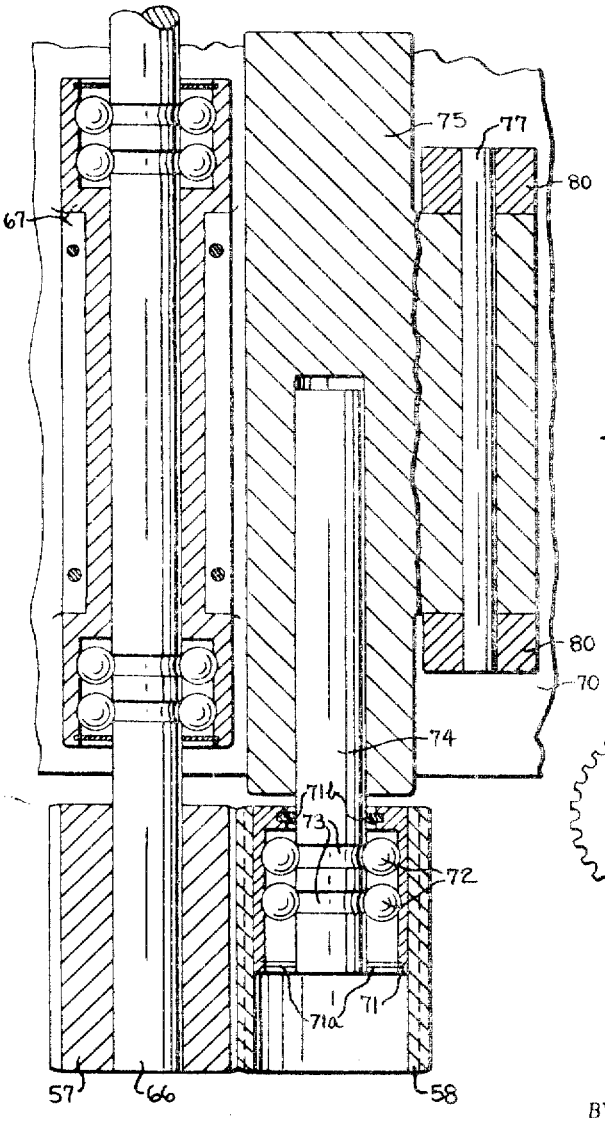
FIGURE 11 is a longitudinal sectional plan view taken substantially along line 11—11 in FIGURE 10.
Figure 12:
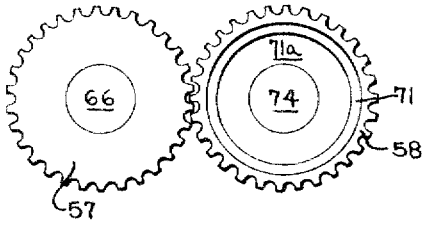
FIGURE 12 is an enlarged fragmentary and somewhat schematic end view of the fluted calender rolls looking substantially along line 12—12 in FIGURE 9.

Here again, it is important to note that the speed of the sliver through the calender rolls is not necessarily dependent upon the speed of the shaft 52 or the machine with which the coiler mechanism may be associated. Instead, the speed of the sliver is determined, to a substantial extent, by the relative positions of the calender rolls. This is important in a carding machine, especially in view of the fact that variations in temperature and humidity, among other factors, may cause a given type of sliver to run slack, at times, and taut at other times. Such variations in sliver characteristics can be readily compensated for merely by adjusting the screw 82 in the proper direction (FIGURES 7, 8 and 10).

It is thus seen that I have provided improved calender roll units for directing sliver into coiler mechanisms wherein the calender rolls are fluted with the flutes being provided with eight degree pressure angles instead of the more commonly used fourteen and one-half degree pressure angles and wherein only one of the calender rolls of a pair is driven while the other of the calender rolls of said pair is a floating roll or is loosely mounted so as to be driven solely by the contact of the stock passing through the nip of the complementary fluted calender rolls and whereby the calender rolls function to insure that the sliver is uniformly passed through the nip of the calender rolls without slippage; to control the speed at which the sliver is fed to the tube gear by the calender rolls; and to cause crimping of the sliver at closely spaced intervals to thereby substantially lend to the tensile strength of the sliver as it is subsequently directed into the can so the sliver will not tear apart or become abnormally stretched during the subsequent drawing of the sliver from the cans and in subsequent sliver processing operations.

In the drawings and specification there has been set forth a preferred embodiment of the invention and although specific terms are employed, they are used in a generic and descriptive sense only and not for purposes of limitation, the scope of the invention being defined in the claims.

I claim:

1. In a machine for processing textile fibers in sliver form, said machine having processing instrumentalities and a coiler including a rotating inclined tube mounted for rotation about a vertical axis; the combination of an improved calender roll unit comprising a driven shaft, a second shaft extending parallel to the driven shaft, a first fluted calender roll fixed on the driven shaft, a second fluted calender roll loosely journaled on the second shaft and meshing with the first roll, [and] the nip of the fluted rolls being disposed closely above the open upper end of the inclined tube *and means to adjustably vary the meshing relationship between the fluted calender rolls and to maintain them in their adjusted relationship* during normal machine operation *whereby the sliver is crimped and the amount of sliver drawn therebetween may be varied.*

[2. In a structure according to claim 1, means for adjusting the second shaft to vary the displacement between the mating surfaces of the first and second fluted rolls.]

3. A structure according to claim 1, wherein the flutes on the fluted rolls each has a pressure angle of eight degrees.

4. In a drawing machine for processing textile fibers in sliver form, said machine having drafting rolls, a coiler including a rotating inclined tube mounted for rotation about a vertical axis and a trumpet spaced above the coiler; the combination of an improved calender roll unit comprising a driven shaft, a second shaft extending parallel to the driven shaft, said shafts extending horizontally between the trumpet and the coiler, a first fluted calender roll fixed on the driven shaft, a second fluted calender roll loosely journaled on the second shaft and meshing with the first roll beneath said trumpet, [and] the nip of the fluted rolls being disposed closely above the open upper end of the inclined tube for drawing the sliver through the trumpet and into the tube *and means to adjustably vary the meshing relationship between the fluted calender rolls and to maintain them in their adjusted relationship* during normal machine operation *whereby the sliver is crimped and the amount of sliver drawn therebetween may be varied.*

5. A structure according to claim 4, wherein the flutes on the fluted rolls each has a pressure angle of eight degrees.

6. In a coiler mechanism for receiving a length of sliver from a source and having means for coiling the sliver into a can, and a rotating shaft disposed adjacent the coiling means; the combination of a first horizontal shaft journaled above the coiling means in a fixed part of said mechanism, a bracket pivoted on said fixed part for pivotal movement substantially parallel to said first shaft, gear means connecting the first shaft with the rotating shaft, a second horizontal shaft fixed to said bracket, extending substantially parallel to said first shaft and located between the pivot point of the bracket and the first shaft, a first fluted calender roll fixed on the first shaft, a second fluted calender roll journaled on the second shaft and meshing with the first roll, the nip of the rolls being positioned for feeding the sliver into the coiling means, and means to adjust the bracket about its pivot point to vary the displacement between the mating surfaces of the fluted rolls to vary the speed at which the sliver is fed into the coiling means.

7. A structure according to claim 6, wherein the flutes on the fluted rolls each has a pressure angle of eight degrees.

8. In a drawing machine for processing textile fibers in sliver form, said machine having drafting rolls, spaced drawing roll stands each provided with an inclined slot in its upper surface, a coiler including a rotating inclined tube mounted for rotation about a vertical axis and a trumpet spaced above the coiler; the combination of an improved calender roll unit comprising a driven shaft, a second shaft extending parallel to the driven shaft, said shafts extending horizontally between the trumpet and the coiler, a first fluted calender roll fixed on the driven shaft, a second fluted calender roll loosely journaled on the second shaft and meshing with the first roll beneath said trumpet, the nip of the fluted rolls being disposed closely above the open upper end of the inclined tube for drawing the sliver through the trumpet and into the tube, said driven shaft being journaled in said stands adjacent said slots, a block adjustably mounted in each slot, opposite ends of the second shaft being fixed in adjacent pairs of said blocks, ears on the upper end of each block overlying adjacent portions of the corresponding roll stands, adjustment screws threaded through said ears and engaging said portions, and said slots being inclined upwardly and away from the driven shaft whereby adjustment of the screws adjusts the displacement between the mating surfaces of the fluted rolls to vary the speed of the sliver passing therebetween.

9. In a machine for processing textile fibers in sliver form, said machine having processing instrumentalities and a coiler including a rotating inclined tube mounted for rotation about a vertical axis; the combination of an improved calender roll unit comprising a driven shaft, a first fluted calender roll fixed on the driven shaft, a second fluted calender roll supported for free rotational movement on an axis parallel to the axis of, and meshing with, the first roll, [and] the nip of the fluted rolls being disposed closely above the open upper end of the inclined tube *and means to adjustably vary the meshing relationship between the fluted calender rolls and to maintain them in their adjusted relationship* during normal machine operation *whereby the sliver is crimped and the amount of sliver drawn therebetween may be varied.*

[10. In a structure according to claim 9, means to adjustably vary the displacement between the first and second calender rolls.]

*11. In a machine for processing textile fibers in sliver form, said machine having processing instrumentalities, a coiler for coiling the sliver and a trumpet positioned above the coiler and in close proximity thereto and through which the sliver is guided in its path of travel to the coiler; the combination of an improved calender roll unit positioned between the trumpet and the coiler comprising a first fluted calender roll, means connected to said fluted roll for driving the same, a second fluted calender roll supported for free rotational movement on an axis parallel to the axis of, and meshing with, the first roll, the nip of the fluted rolls being disposed closely above the coiler and means to adjustably vary the meshing relationship between the fluted calender rolls and to maintain them in their adjusted relationship* during normal machine operation *whereby the sliver is crimped and the amount of sliver drawn therebetween may be varied.*

*12. In a coiler mechanism, for processing textile fibers in sliver form, having rotatable means with an opening therein through which the sliver passes for coiling the same into a receptacle such as a can, and a trumpet positioned above said rotatable means and in close proximity thereto and through which the sliver is guided in its path of travel, the combination of an improved calender roll unit positioned between the rotatable means and the trumpet and comprising a fluted calender roll, means connected to said fluted roll for driving the same, a second fluted calender roll supported for free rotational move-*

*ment on an axis parallel to the axis of, and meshing with, the first fluted roll, the nip of the fluted rolls being disposed closely above the opening in the rotatable means and means to adjustably vary the meshing relationship between the fluted calender rolls and to maintain them in their adjusted relationship* during normal machine operation *whereby the sliver is crimped and the amount of sliver drawn therebetween may be varied.*

13. In a machine for processing textile fibers in sliver form, said machine having processing instrumentalities and a coiler including a rotating inclined tube mounted for rotation about a vertical axis; the combination of an improved calender roll unit comprising a driven shaft, a first fluted calender roll fixed on the driven shaft, a second fluted calender roll supported for free rotational movement on an axis parallel to the axis of and meshing with the first roll, the nip of the fluted rolls being disposed closely above the open upper end of the inclined tube, and means for positioning said fluted calender rolls in predetermined intermeshing relation and for maintaining the same in this predetermined intermeshing relationship during normal machine operation whereby the amount of sliver drawn therebetween is controlled and crimp is imparted to the sliver.

14. In a machine for processing textile fibers in sliver form, said machine having processing instrumentalities and a coiler including a rotating inclined tube mounted for rotation about a vertical axis; the combination of an improved calender roll unit comprising a driven shaft, a first fluted calender roll fixed on the driven shaft, a second fluted calender roll supported for free rotational movement on an axis parallel to the axis of the first roll and defining a nip therewith, the nip of the fluted rolls being disposed closely above the open upper end of the inclined tube, and means mounting said calender rolls for relative movement into intermeshing relationship and for limiting such movement of said calender rolls to position the same in predetermined intermeshing relationship and for maintaining the same in this predetermined intermeshing relationship during normal machine operation to control the amount of sliver drawn therebetween and to impart crimp to the sliver.

References Cited by the Examiner

The following references, cited by the Examiner, are of record in the patented file of this patent or the original patent.

UNITED STATES PATENTS

| | | | |
|---|---|---|---|
| 392,950 | 11/1888 | Dunham et al. | 19—260 |
| 532,405 | 1/1895 | Threlfall | 19—159 |
| 572,433 | 12/1896 | Meats et al. | 19—159 |
| 638,975 | 12/1899 | Mills et al. | 19—159 |
| 802,492 | 10/1905 | Birch | 19—240 |
| 951,863 | 3/1910 | Wessel | 28—72 |
| 1,825,784 | 10/1931 | Engle | 19—159 |
| 2,419,320 | 4/1947 | Lohrke | 19—66 |
| 2,693,008 | 11/1954 | Upton et al. | 19—66 |

MERVIN STEIN, *Primary Examiner.*

DONALD W. PARKER, *Examiner.*

D. NEWTON, *Assistant Examiner.*